(Model.)

J. ESSELBACH.
WIRE FASTENER FOR BOXES.

No. 381,684. Patented Apr. 24, 1888.

Witnesses.
Wm. H. Lowe.
Alfred Joughmans.

Inventor.
Joseph Esselbach
per Rader & Riesen
Attorneys.

UNITED STATES PATENT OFFICE.

JOSEPH ESSELBACH, OF DRESDEN, SAXONY, GERMANY.

WIRE FASTENER FOR BOXES.

SPECIFICATION forming part of Letters Patent No. 381,684, dated April 24, 1888.

Application filed December 17, 1886. Serial No. 221,837. (Model.)

*To all whom it may concern:*

Be it known that I, JOSEPH ESSELBACH, a citizen of Germany, residing at Dresden, in the Empire of Germany, have invented a new and Improved Wire Fastener for Boxes, of which the following is a specification.

This invention relates to a wire fastener for connecting the adjoining sides of pasteboard and other boxes. The new fastener is to be used in lieu of staples, which are objectionable, as they require the ends of their shanks to be turned over on the inner face of the box.

The invention consists in the various features of improvement hereinafter more fully pointed out and claimed.

Figure 1:
Figure 2:
Figure 3:
Figure 4:
Figure 5:
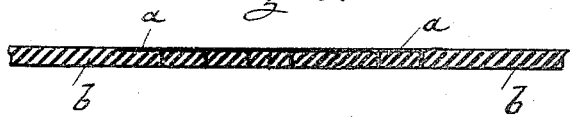
Figure 6:
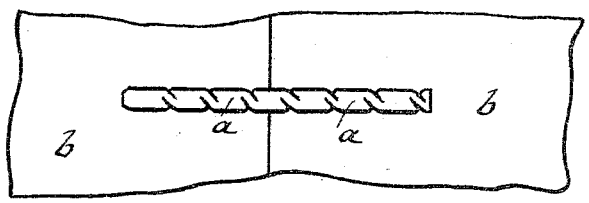
Figure 7:
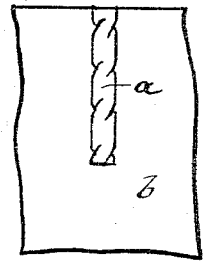
Figure 8:
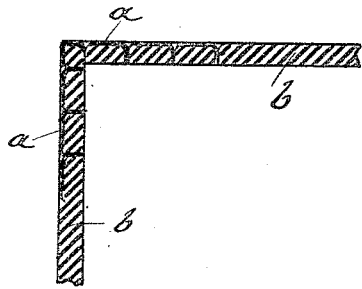

In the accompanying drawings, Figure 1 represents a cross-section through the wire before it is twisted. Figs. 2 and 3 are similar sections through different forms of wire. Fig. 4 is a side view of the wire after it is twisted. Fig. 5 is a section through two parallel adjoining sides of a box, showing the wire driven into them. Fig. 6 is a top view thereof. Fig. 7 is an end view of Fig. 8, and Fig. 8 is a section through two adjoining sides of a box provided with my improved fastener and placed at right angles.

The letter $a$ represents a length of wire having a suitable form in cross-section, such as a rectangular form, as in Fig. 1, or an oval form, as in Fig. 2, or a lozenge form, as in Fig. 3. This wire is twisted lengthwise into a spiral shape, as shown in Fig. 4, and is then cut up into suitable lengths. The wire is then placed flat upon the sides $b$ to be joined and is driven down into the same by a die or other suitable tool. The spiral edge of the wire will thus be embedded into the box and thus securely attach the fastener in place. The upper side of the wire will by the same operation be flattened out, as shown in Fig. 5, so as to lie flush with the surface of the box.

If desired, the wire $a$ may have a serrated edge.

What I claim is—

The combination of a box having sides $b$ with spiral wire $a$, the edge of which is embedded in sides $b$ and the upper side of which is flattened out and is flush with such sides, substantially as described.

In testimony whereof I have signed my name to this specification in the presence of two subscribing witnesses.

JOS. ESSELBACH.

Witnesses:
 BRUNO ESSELBACH,
 EMIL DOMSCH.